Patented Mar. 22, 1938

2,112,102

UNITED STATES PATENT OFFICE 2,112,102

MANUFACTURE OF BASIC COPPER ARSENATE

Eberhard Klumpp, Wandsbeck, near Hamburg, Germany

No Drawing. Application May 29, 1935, Serial No. 24,056. In Germany June 2, 1934

3 Claims. (Cl. 23—53)

My invention relates to the production of basic copper arsenate of the formula $4CuOAs_2O_5H_2O$ and particularly of such a product which may be advantageously used in the extermination of noxious animals and plants.

It is known to prepare basic copper arsenate by reacting soluble copper salts with sodium biarsenate. This process causes the acid and all the alkali introduced to be transformed into sodium salt which is without any value so that the process of production is rather expensive. The loss of valuable chemicals cannot be avoided in the two other known processes wherein either copper arsenite is converted into copper arsenate by being roasted or copper carbonate is reacted with arsenic acid. Also when reacting basic copper chloride with arsenic acid or sodium arsenate comparatively large quantities of chemicals are wanted. The products obtained by these processes are not so finely-grained as to be very effective in practical use.

It is further known to prepare copper arsenate by treating metallic copper in an aqueous solution of arsenous acid with oxygen or air. In this way large quantities of compressed air are consumed, e. g. 5000 l. compressed air of 80° C. for producing 80 g. copper arsenate. Besides the reaction proceeds very slowly, so that only a coarse-grained product may be obtained. Complicated and voluminous equipments are necessary for this process.

An object of my invention is to provide a new method for the preparation of basic copper arsenate wherein the disadvantages cited above are avoided. A further object of my invention is to prepare in a very simple way a product which can be directly suspended in water, so that a highly stable suspension is obtainable.

I have found that if copper oxide is reacted with arsenic acid a product is formed which has the formula: $4CuOAs_2O_5H_2O$, that is a basic copper arsenate. I further found that the reaction takes place rapidly if the copper oxide used is fine-grained and suspended in water, and the temperature is held near the boiling point of the solutions used. The reaction may be accelerated by adding small quantities of a strong acid, as sulphuric acid.

The product obtained consists of fine crystals. It may be understood that it is in the scope of my invention to vary in wide limits the conditions of the reaction, as for instance the quantities of water, of acid used, the velocity of stirring. Thus the size of grains and the colour of the product may be varied. It is possible to prepare yellow green products with a diameter of 3/10000 mm. and other olive green products with a diameter of 36/1000 mm.

The following examples illustrate the invention and it is understood that the invention is in no wise limited thereto:

Example No. 1

130 g. fine-grained copper oxide are suspended in 100 ccm. of water. The suspension is heated and while stirring 10 g. concentrated sulphuric acid are added. Thereafter a solution of 115 g. $As_2O_5$ in 250 cm³ water are gradually dropped in, while stirring is continued until the reaction is completed. After filtering and washing out a light green product is obtained which contains 40.4% $As_2O_5$ and 43.6% Cu.

Example No. 2

A solution of 46 g. $As_2O_5$ in 150 cm³ water is kept boiling when a suspension of 64 g. fine-grained copper oxide is slowly added. The product separated in a similar way as in Example 1 contains 40.6% $As_2O_5$ and 43.8% Cu.

Example No. 3

To a solution of 46 g. $As_2O_5$ in 350 cm³ water, which is heated to the boiling temperature, 64 g. copper oxide are added, whilst the solution is rapidly stirred. The product of the reaction contains 40.5% $As_2O_5$ and 44.25% copper.

I claim:

1. A direct process for the production of finely grained basic copper arsenate defined by the formula, $Cu(OH)_2.Cu(AsO_4)_2$, and capable of being suspended directly in water to form a highly stable suspension, which comprises reacting finely grained copper oxide with a solution containing arsenic pentoxide at the boiling point of the solution and stirring vigorously during the reaction until the reaction is substantially complete whereby basic copper arsenate, $Cu(OH)_2.Cu(AsO_4)_2$ is obtained as particles having a diameter of less than about 3/10,000 of a millimeter and capable of being directly suspended in water to form a highly stable suspension having a neutral reaction.

2. A direct process for the production of finely grained basic copper arsenate defined by the formula, $Cu(OH)_2.Cu(AsO_4)_2$, and capable of being suspended directly in water to form a highly stable suspension, which comprises reacting finely grained copper oxide with a solution containing arsenic pentoxide at the boiling temperature of the solution in the presence of small quantities of strong acids, and stirring vigorously during the reaction, whereby basic copper arsenate defined by the formula $Cu(OH)_2.Cu(AsO_4)_2$ is obtained as particles having a diameter of less than 3/10,000 of a millimeter, and capable of being directly suspended in water to form a highly stable suspension having a neutral reaction.

3. A direct process for the production of finely grained basic copper arsenate defined by the formula, $Cu(OH)_2.Cu(AsO_4)_2$, capable of being suspended directly in water to form a highly stable suspension, which comprises establishing a vigorously stirred suspension of finely grained copper oxide containing about 2% by weight of strong acid, heating said suspension to the boiling temperature, adding an aqueous solution of arsenic pentoxide, continuing the stirring until the reaction is substantially complete, and separating the thus produced basic copper arsenate having a formula of $Cu(OH)_2.Cu(AsO_4)_2$ as particles having a diameter of less than about 3/10,000 of a millimeter, capable of being directly suspended in water to form a highly stable suspension having a neutral reaction.

EBERHARD KLUMPP.